United States Patent Office 2,865,924
Patented Dec. 23, 1958

2,865,924

NOVEL THIAZOLINES AND PROCESS FOR THEIR MANUFACTURE

Friedrich Asinger, Max Thiel, and Hans Kaltwasser, Leuna, and Gerhard Reckling, Spergau, Germany, assignors to Veb Leuna-Werke "Walter Ulbricht," Leuna, Germany No Drawing. Application October 10, 1956
Serial No. 615,013

Claims priority, application Germany April 14, 1956

9 Claims. (Cl. 260—306.7)

This invention relates to novel thiazolines and a process for their production.

Theoretically, thiazolines may occur in three isomeric forms, dependent on the position of the double bond in the ring system. The synthesis of Δ-2,3 and Δ-4,5-thiazolines has already been described in the chemical literature. However, up to this time nothing was known with regard to the synthesis of the third isomeric form, i. e. Δ-3,4-thiazolines.

It is an object of this invention to provide Δ-3,4-thiazolines.

A further object of this invention is the provision of a process for the production of Δ-3,4-thiazolines.

In accordance with this invention, Δ-3,4-thiazolines are obtained by reacting sulfur with a compound comprising a keto-group under the simultaneous action of ammonia. This reaction is preferably carried out at room temperature. Such reactions between sulfur and ammonia with so-called oxo-compounds, i. e. compounds comprising a keto-group, are hitherto not known. The Δ-3,4-thiazolines obtained as reaction products have—in contrast to their isomers, i. e. Δ-2,3-thiazolines and Δ-4,5-thiazolines—hitherto not been described in the chemical literature.

The inventive process may, for example, be carried out in such a manner, that ammonia in gaseous form is introduced at room temperature into a slurry containing one mole of sulfur and two moles of ketone. The reaction may also be carried out in the presence of solvents such as for example alcohols, benzene, toluene, different kinds of ethers and the like, which solvents at the same time may serve as carriers for the water which is formed during the reaction. (The term "carrier" as used herein is deemed to mean a solvent which upon distillation carries over water.) The use of such solvents is particularly advantageous if keto-compounds of solid consistency are used.

According to a further feature of this embodiment of the invention the same valuable Δ-3,4-thiazolines are obtained if the reaction is carried out not with elementary sulfur but with sulfur which is bound in sulfidic manner, that is when a polysulfide is used.

In this latter case the reaction may be carried out, for example, in such a manner that gaseous ammonia is introduced into a mixture comprising a keto-compound and a polysulfide. The polysulfide and the keto-compound may be dissolved in water or in other suitable solvents. Ammonium-polysulfide, sodium polysulfide and other inorganic polysulfides are particularly suitable as polysulfides to be used in the reaction. However, in the same manner organic polysulfides, as for example diethyl-polysulfide, dipropyl-polysulfide or the like, may be employed in the process.

The formation of Δ-3,4-thiazolines in accordance with the inventive process will be readily understood by studying the following formula illustrating the reaction of diethyl-ketone:

(I)
$$2C_2H_5-CO-CH_2-CH_3 + S + NH_3 \longrightarrow$$

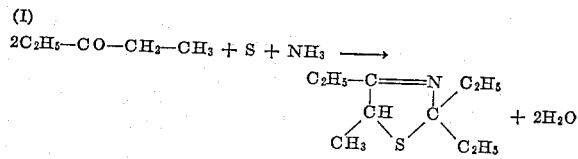

$$+ 2H_2O$$

As keto-compounds to be used in the inventive reaction, all those compounds come into consideration which pertain to the general formula

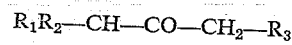

wherein $R_1$, $R_2$ and $R_3$ may stand for alkyl, cycloalkyl, aryl, aralkyl or hydrogen. From the above general formula it will thus be realized that the ketones or keto-compounds to be employed comprise at least one CH— and one $CH_2$— group directly adjacent to the keto-group and include alicyclic ketones, such as cyclohexanone, methyl-cyclohexanone and the like compounds. The keto-compounds to be employed in the inventive reaction may also comprise further functional groups, such as for example amino-groups, hydroxyl-groups, carboxyl-groups and the like, or aromatic radicals, cycloaliphatic radicals and heterocyclic radicals. The course of the reaction is not influenced by the use of keto-compounds comprising such further functional groups or radicals, but it proceeds in analogous manner to a reaction employing simple ketones. This is exemplified by the following formula which illustrates the joint action of sulfur and ammonia on ω-acetylvaleric acid.

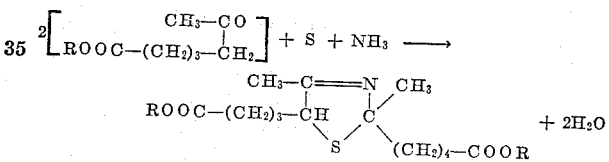

Further, unsaturated ketones may be used as well.

The reaction products, i. e. the Δ-3,4-thiazolines obtained by the inventive reaction, that is obtained by the interaction of sulfur or polysulfides, ammonia and keto-compounds exhibit considerable physiological action and may thus be used in the synthesis of therapeutic agents. They constitute valuable intermediates and final products for the pharmaceutical industry. Further, they may be used for many other purposes, as, for example, as agents for combatting pests, as preservatives for the preservation of wood, as weed killers and as protecting agents against rust and aging.

The invention will now be described by several examples. It should be understood, however, that these examples are given by way of illustration rather than by way of limitation and that many changes may be made in, for example, quantities, starting materials and process conditions in general, without departing in any way from the spirit and scope of the invention.

Example 1

144 grams of methylethylketone are mixed with 32 grams of sulfur (flower of sulfur or powderized roll sulfur). Gaseous ammonia is introduced into the slurry thus obtained until the sulfur has been dissolved, during which period the reaction mixture may be heated up to 80° C. A dark brown reaction mixture is obtained to which ether is added and the alkaline solution thus obtained is washed with water. The ether is then removed and the residue is distilled whereby 135 grams 2,4,5-trimethyl-2-ethyl-thiazoline-Δ-3,4($C_8H_{15}NS$) having a boiling point of 70° C. at 6 mm. pressure is obtained. The yield corresponds to about 85–90% of the theory. The reaction proceeds according to the following formula:

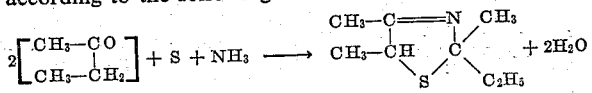

Example 2

172 grams of diethylketone are mixed with 32 grams of sulfur (flower of sulfur or powderized roll sulfur). Gaseous ammonia is introduced into this slurry. The working up of the reaction mixture thus obtained, may be carried out as described in Example 1, or, if desired, the reaction mixture may be dissolved in benzene or in another solvent which is inert to the reaction, whereafter one washes with water. 150 grams of 2,2,4-triethyl-5-methylthiazoline-Δ-3,4($C_{10}H_{19}NS$) having a boiling point of 97° C./10 mm. are obtained in the form of an almost colorless oil. The yield corresponds to 80 to 85% of the theory. The reaction proceeds according to the Formula I given above.

Example 3

344 grams of 4-acetylvaleric acid ethylester are mixed with 32 grams of sulfur and are subsequently treated with gaseous ammonia. The brown colored reaction product is diluted with ether and carefully washed with water. The ether solution is concentrated and the residue is distilled in a high vacuum. 220 grams of a viscous, almost colorless oil having a boiling point of 100° C./$10^{-4}$ mm. are obtained. This oil proved to be 2,4-dimethyl-2-(ω-carboxethyl-n-butyl-5-(ω-carboxethyl-n-propyl)-thiazoline-Δ-3,4($C_{18}H_{21}O_4NS$). The reaction proceeds in accordance with the following formula:

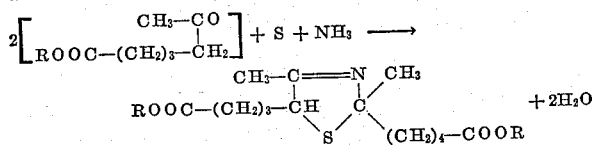

Example 4

196 grams of cyclohexanone are mixed with 32 grams of sulfur and subsequently treated with ammonia. After the completion of the reaction which may be noted by the fact that the sulfur seems to have disappeared and the temperature starts going down, the reaction mixture may be worked up in the same manner as has been described in connection with Examples 1–3. However, if desired, the reaction mixture may be left to stand overnight. In the latter case, a solid crystal mass forms during the night which crystal mass is sucked off from the dark residual oils. The still sticky crystals are recrystallized from benzine, ether or dipropylether. 165 grams of 2,2-pentamethylene-hexahydrobenzthiazoline-Δ-3,4-($C_{12}H_{19}NS$) having a boiling point of 160–164° C./10 mm. and a melting point of 83° C. are obtained. The yield corresponds to 75–80% of the theory. The reaction proceeds in accordance with the following formula:

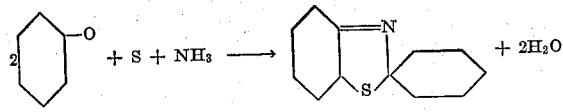

Example 5

228 grams of di-n-propylketone are mixed with 32 grams of sulfur and 500 cubic centimeters of benzene (or with another solvent which may serve as carrier for the water to be formed). Gaseous ammonia is introduced into the mixture at the boiling temperature of the latter. The introduction of ammonia is continued until no more water-containing benzene distils off. The benzene-containing reaction mixture is then washed with water and subsequently subjected to a vacuum distillation. 166 grams of 2,2,4-tri-n-propyl-5-ethylthiazoline-Δ-3,4-($C_{14}H_{27}NS$) having a boiling point of 130° C./8 mm. were obtained.

Example 6

196 grams of cyclohexanone are added to an aqueous sodium-polysulfide solution, which latter was prepared from 31 grams of $Na_2S$ in 150 cubic centimeters of water and 32 grams of powderized sulfur. The mixture is treated for about two hours at 45° C. with a weak flow of ammonia while stirring. The reaction mixture is then extracted with ether and the ether extract is dried. By undercooling the ether solution, 125 grams of 2,2-pentamethylenehexahydrobenzthiazoline-Δ-3,4($C_{12}H_{19}NS$) having a boiling point of 160–164° C. and a melting point of 82° C. is obtained. The yield corresponds to 60% of the theory.

Example 7

144 grams of butanon are added to an aqueous sodium polysulfide solution, which latter was prepared from 31 grams of $Na_2S$ in 150 cubic centimeters of water and 32 grams of powderized sulfur. The mixture is treated for two hours with a flow of ammonia while stirring well. The reaction mixture is then extracted with ether and the ether extract is dried. After the expelling of the ether, 105 grams of 2,4,5-trimethyl-2-ethylthiazoline-Δ-3,4-($C_8H_{15}NS$) distil off at 82° C. and 18 millimeter pressure.

Example 8

86 grams of diethylketone are admixed with 110 grams of diethylpentasulfide. A lively flow of gaseous ammonia is introduced into the mixture thus obtained. The introduction of the ammonia causes heating of the mixture. When the temperature of the reaction mixture starts going down again, the latter is cooled and diluted with water, whereafter the organic layer formed is taken up with ether. After washing with water and subsequent drying of the ether extract, the ether is expelled. The residue is then distilled whereby 83 grams of 2,2,4-triethyl-5-methylthiazoline-Δ-3,4 of a boiling point of 97° C./10 mm. are obtained. The yield corresponds to 89% of the theory.

We claim:

1. A process for the production of thiazolines-Δ-3,4 which comprises reacting a sulfur reactant selected from the group consisting of elementary sulfur, organic polysulfides, and inorganic polysulfides, with ammonia and a ketone of the general formula:

$$R'—CO—CH_2—R''$$

wherein R′ and R″ are radicals selected from the group consisting of alkyl, aryl hydrocarbon, aralkyl hydrocarbon, and cycloalkyl hydrocarbon radicals, and the carbalkoxy derivatives of said hydrocarbon radicals.

2. In a process as claimed in claim 1, wherein said reaction is carried out at room temperature.

3. In a process as claimed in claim 1, wherein said reaction is carried out in the presence of organic solvents.

4. In a process as claimed in claim 1, wherein about 2 moles of said compound are reacted with about 1 mole of said member.

5. A process for the production of 2,4,5-trimethyl-2-ethylthiazoline-3,4-Δ, comprising the steps of introducing gaseous ammonia into a mixture containing methylethylketone and sulfur in a mole relation of about 2:1 until said sulfur has been dissolved, and separating the product thus formed.

6. A process for the production of 2,2,4-triethyl-5-methylthiazoline-Δ-3,4, comprising the steps of introducing gaseous ammonia into a mixture containing diethylketone and sulfur in a mole relation of about 2:1 until said sulfur has been dissolved, and separating the product thus formed.

7. A process for the production of 2,4-dimethyl-2-(ω-carboxethyl-n-butyl)-5-(ω-carboxethyl-n-propyl)-thiazoline-Δ-3,4, comprising the steps of introducing gaseous ammonia into a mixture comprising 4-acetylvaleric acid ethylester and sulfur in a mole relation of about 2:1 until the sulfur has been dissolved, and separating the product thus formed.

8. A process for the production of 2,2-pentamethylene-hexahydrobenzthiazoline-Δ-3,4, comprising the steps of introducing gaseous ammonia into a mixture containing cyclohexanone and sulfur in a mole relation of about 2:1 until the sulfur has been dissolved, and separating the product thus formed.

9. A process for the production of 2,2,4-tri-n-propyl-5-ethylthiazoline-Δ-,3,4, comprising the steps of preparing a mixture of di-n-propylketone, sulfur and an organic solvent, the mole relation between said ketone and said sulfur being about 2:1, introducing gaseous ammonia into said mixture at its boiling temperature, maintaining said introduction of ammonia until no more water-containing solvent escapes, and separating the product thus formed during the reaction.

No references cited.